United States Patent
Moore et al.

(10) Patent No.: US 11,996,003 B2
(45) Date of Patent: *May 28, 2024

(54) TRAINING SYSTEM AND DEVICE

(71) Applicant: Jemella Limited, Leeds (GB)

(72) Inventors: Timothy Moore, Leeds (GB); Matt James, Leeds (GB); Daniel Ramos, Leeds (GB)

(73) Assignee: JEMELLA LIMITED, Leeds (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,200

(22) Filed: Jan. 6, 2023

(65) Prior Publication Data

US 2023/0146631 A1 May 11, 2023

Related U.S. Application Data

(63) Continuation of application No. 16/954,039, filed as application No. PCT/GB2018/053650 on Dec. 18, 2018, now Pat. No. 11,574,556.

(30) Foreign Application Priority Data

Dec. 22, 2017 (GB) ..................... 1721818

(51) Int. Cl.
*G09B 19/00* (2006.01)
*A45D 1/04* (2006.01)
(Continued)

(52) U.S. Cl.
CPC ........... *G09B 19/0076* (2013.01); *A45D 1/04* (2013.01); *A45D 2/001* (2013.01); *A45D 44/005* (2013.01);
(Continued)

(58) Field of Classification Search
CPC .... G09B 19/0076; G09B 5/04; G09B 19/003; G09B 19/24; A45D 1/04; A45D 2/001; A45D 44/005; A45D 2001/002
(Continued)

(56) References Cited

U.S. PATENT DOCUMENTS

| 11,574,556 B2 | 2/2023 | Moore et al. |
| 2005/0011533 A1 | 1/2005 | Ruben |

(Continued)

FOREIGN PATENT DOCUMENTS

| CN | 1973721 A | 6/2007 |
| CN | 102427861 A | 4/2012 |

(Continued)

OTHER PUBLICATIONS

"Application Serial No. 18 145,467, Preliminary Amendment filed Jan. 6, 2023", 8 pgs.

(Continued)

*Primary Examiner* — Robert P Bullington
(74) *Attorney, Agent, or Firm* — Merchant & Gould P.C.

(57) ABSTRACT

A beauty product device is disclosed which includes a variety of sensors for sensing the way in which a user is operating the device. The sensor data can be processed and compared with pre-stored data representative of a desired style and feedback messages generated and provided back to the user to help them achieve the style they wish to achieve based on the comparison.

25 Claims, 9 Drawing Sheets

(51) Int. Cl.
    *A45D 2/00*     (2006.01)
    *A45D 44/00*    (2006.01)
    *G09B 5/04*     (2006.01)
    *G09B 19/24*    (2006.01)
    *A45D 1/00*     (2006.01)

(52) U.S. Cl.
    CPC ............. *G09B 5/04* (2013.01); *G09B 19/003* (2013.01); *G09B 19/24* (2013.01); *A45D 2001/002* (2013.01)

(58) Field of Classification Search
    USPC .......................................................... 434/94
    See application file for complete search history.

(56) References Cited

U.S. PATENT DOCUMENTS

| | | |
|---|---|---|
| 2011/0247156 A1 | 10/2011 | Schmid et al. |
| 2012/0227758 A1* | 9/2012 | Ford ........................ A45D 2/001 132/229 |
| 2014/0378194 A1 | 12/2014 | Bentley et al. |
| 2015/0164213 A1 | 6/2015 | Hyde et al. |
| 2015/0342515 A1 | 12/2015 | Hutchings et al. |
| 2016/0171778 A1 | 6/2016 | Grossman et al. |
| 2017/0061817 A1 | 3/2017 | Mettler May |
| 2018/0075776 A1* | 3/2018 | Heitmann ............. A45D 44/005 |
| 2018/0184796 A1 | 7/2018 | Balooch et al. |
| 2019/0362134 A1 | 11/2019 | Kim et al. |
| 2021/0082310 A1 | 3/2021 | Moore et al. |

FOREIGN PATENT DOCUMENTS

| | | |
|---|---|---|
| CN | 203152832 U | 8/2013 |
| CN | 103732098 A | 4/2014 |
| CN | 203801925 U | 9/2014 |
| CN | 104394731 A | 3/2015 |
| CN | 104822287 A | 8/2015 |
| CN | 105744854 A | 7/2016 |
| CN | 106030683 A | 10/2016 |
| CN | 106233358 A | 12/2016 |
| CN | 107105850 A | 8/2017 |
| CN | 107927070 A | 4/2018 |
| EP | 1857015 A1 | 11/2007 |
| FR | 2964023 A1 | 3/2012 |
| GB | 2508590 A | 6/2014 |
| IN | 201647015376 A | 8/2016 |
| JP | 2004209284 A | 7/2004 |
| KR | 20170117262 A | 10/2017 |
| WO | WO-2013104903 A2 | 7/2013 |
| WO | WO-2014036423 A1 | 3/2014 |
| WO | WO-2015071656 A1 | 5/2015 |
| WO | WO-2017045719 A1 | 3/2017 |
| WO | WO-2018126047 A1 | 7/2018 |
| WO | WO-2022023718 A1 | 2/2022 |

OTHER PUBLICATIONS

"U.S. Appl. No. 16/954,039, 312 Amendment filed Oct. 6, 2022", 7 pgs.
"U.S. Appl. No. 16/954,039, Corrected Notice of Allowability dated Oct. 4, 2022", 6 pgs.
"U.S. Appl. No. 16/954,039, Corrected Notice of Allowability dated Dec. 27, 2022", 3 pgs.
"U.S. Appl. No. 16/954,039, Non Final Office Action dated Feb. 16, 2022", 24 pgs.
"U.S. Appl. No. 16/954,039, Notice of Allowance dated Sep. 22, 2022", 8 pgs.
"U.S. Appl. No. 16/954,039, Notice of Non-Compliant Amendment dated Aug. 23, 2022", 2 pgs.
"U.S. Appl. No. 16/954,039, PTO Response to Rule 312 Communication dated Oct. 14, 2022", 4 pgs.
"U.S. Appl. No. 16/954,039, Response filed Jul. 15, 2022 to Non Final Office Action dated Feb. 16, 2022", 11 pgs.
"U.S. Appl. No. 16/954,039, Response filed Sep. 8, 2022 to Notice of Non-Compliant Amendment dated Aug. 23, 2022", 11 pgs.
"Chinese Application Serial No. 201880087253, Office Action dated Jan. 6, 2022", w/English Translation, (dated Jan. 6, 2022), 17 pgs.
"Chinese Application Serial No. 201880087253, Office Action dated Apr. 15, 2022", w/concise statement of relevance, (dated Apr. 15, 2022), 9 pgs.
"Chinese Application Serial No. 201880087253, Office Action dated Aug. 4, 2021", w/English Translation, (dated Aug. 4, 2021), 18 pgs.
"Chinese Application Serial No. 201880087253.3 Office Action dated Nov. 8, 2022", 10 pgs.
"Chinese Application Serial No. 201880087253.3, Office Action dated Jan. 6, 2022", w/Concise Statement of Relevance, (dated Jan. 6, 2022), 10 pgs.
"International Application Serial No. PCT/GB2018/053650, International Search Report dated Mar. 26, 2019", (dated Mar. 26, 2019), 3 pgs.
"International Application Serial No. PCT/GB2018/053650, Written Opinion dated Mar. 26, 2019", (dated Mar. 26, 2019), 6 pgs.
"United Kingdom Application Serial No. 2204014.1, Examination Report dated Sep. 23, 2022", 4 pgs.
"United Kingdom Application Serial No. 2204019.0.1, Examination Report dated Sep. 23, 2022", 4 pgs.
"United Kingdom Application Serial No. 2208970.0, Examination Report dated Oct. 11, 2022", 4 pgs.
Astete, Mario Arturo Mannheim, et al., "Automotive Laminated Glazing With Enhanced Spectral Properties Using Band Absorption Dyes", U.S. Appl. No. 62/440,448, filed Dec. 30, 2016, (Dec. 30, 2016), 12 pgs.
Heitmann, Melissa, et al., "Systems, Devices, and Methods Including Connected Styling Tools", U.S. Appl. No. 62/394,001, filed Sep. 13, 2016, (Sep. 13, 2016), 20 pgs.

* cited by examiner

TRAINING SYSTEM AND DEVICE

CLAIM FOR PRIORITY

This application is a continuation of U.S. application Ser. No. 16/954,039, filed Jun. 15, 2020, which is a U.S. National Stage Filing under 35 U.S.C. 371 from International Application No. PCT/GB2018/053650, filed on Dec. 18, 2018, and published as WO2019/122838 on Jun. 27, 2019, which claims the benefit of priority to Great Britain Application No. 1721818.1, filed on Dec. 22, 2017; the benefit of priority of each of which is hereby claimed herein, and which applications and publication are hereby incorporated herein by reference in their entireties.

FIELD

The present invention relates to a training system and to parts thereof that are used to train users to use a beauty product device. The invention has particular although not exclusive relevance to a training system and hair styling devices that can help teach users how to achieve desired hair styles using the device.

BACKGROUND

Historically, in the high performance beauty product world, stylists have been important in teaching their clients (users) how to use products, both electrical and wet line, to get the style the client wants to achieve. However, with the growth of internet shopping and direct retailing, this link between the client and the stylist is becoming weaker and hence it is hard for the client to learn how to use the product most effectively to achieve the desired styling. Many people are turning to online tutorials to help them achieve the style they wish to achieve. These tutorials can be in the form of videos and/or written descriptions on websites such as YouTube®. However, the inventors have realised that these videos only provide a limited amount of relevant information to the user and what is needed, therefore, is a new system and method that will provide improved training to the user to use the beauty product device.

The inventors have realised that by making the beauty product device more intelligent, they can capture more information about the way that the user is using the device and using stored information can provide feedback to the user to help them achieve the style they wish to achieve.

In particular, currently available electrical styling products are "dumb" in that they do not know how they are being used—they simply undertake the task for which they have been designed. They do not have sensors to measure how they are being used or how they are performing. Nor do they have communication circuitry to allow them to communicate with the user to give them feedback on how they are using the device and how they might change their use to help achieve the style they wish to achieve.

Accordingly, preferred embodiments of the present invention aim to provide devices and methods which address or at least partially deal with the above needs. Although for efficiency of understanding for those of skill in the art, the invention will be described in detail using hair care products as an example, the principles of the invention can be applied to a wide range of beauty product devices such as hair stylers, crimpers, curlers, UV lamp systems for curing nail varnish or gel, make-up applicators, and/or the like.

According to one aspect, the present invention provides a beauty product system for performing a treatment on a user, the system comprising: an input for allowing the user to specify a desired treatment to be performed; a beauty product device that is manipulable by the user to perform the desired treatment on the user; the beauty product device having sensors for sensing and outputting sensor data indicative of operational parameters of the beauty product device during the treatment; and a processor configured to process the sensor data to determine if the user's usage of the beauty product device will achieve the user's desired treatment and to output one or more feedback messages for the user to help the user achieve the desired treatment.

The beauty product device may include communication circuitry so that the sensor data can be transmitted to an external processing device. In this case, the processor may be provided in the external processing device and the one or more feedback messages may be output on a user interface associated with the user.

The output one or more feedback messages may be output to the user as an audible or visual signal and may comprise instructions for the user on how to use (e.g. how to move) the beauty product device to achieve the desired treatment.

In some embodiments, the sensor data includes motion data that indicates how the beauty product device is being moved by the user and wherein the pre-stored data includes information on how the device should be moved by the user to achieve the desired treatment.

Typically, the beauty product device is a hand held device that the user can move to effect the desired treatment.

The invention also provides a beauty product device for performing a treatment on a user, the device comprising: an input for allowing the user to specify a desired treatment to be performed; sensors for sensing and outputting sensor data indicative of operational parameters of the beauty product device during the treatment; and a processor configured to process the sensor data to determine if the user's usage of the beauty product device will achieve the user's desired treatment and to output one or more feedback messages for the user to help the user achieve the desired treatment.

The invention also provides a beauty product device for performing a treatment on a user, the device comprising: sensors for sensing and outputting sensor data indicative of operational parameters of the beauty product device during the treatment; an input for allowing the user to specify a desired treatment to be performed; and communication circuitry for communicating the sensor data to an external a processor for processing the sensor data to determine if the user's usage of the beauty product device will achieve the user's desired treatment.

The invention also provides corresponding methods and computer program products.

In order to provide usage feedback to the end user or client, the beauty product device being used is designed to include a variety of sensors including one or more of and preferably several of:

Temperature sensors to measure important surface temperatures e.g. plate temperature. These could be in the form of thermocouples, thermistors or IR sensing devices.

Temperature sensors to measure the temperature of the substrate being treated e.g. IR sensing devices.

MEMS gyroscopes to measure the orientation of the product.

MEMS accelerometer to measure the movement of the product on three axes.

Humidity sensors to measure the amount of water vapour coming off the substrate during the treatment.

Gas sensors to measure gases coming from the surface during the treatment, particularly sulphur dioxide.

Dielectric sensors to detect variation in the relative permittivity of the substrate being treated. Sensing this property allows any changes in the substrate to be measured as the treatment progresses.

Power used.

These sensors interface to a micro processing unit (MPU) and memory. The data can then be stored and processed on the beauty product device or be communicated to another device with more processing power (for example, a smart phone) for processing with the result being fed back to the originating beauty product device or the user via either device to improve the usage of the beauty product device. The data can also be used to provide diagnostic information about the substrate being treated—such as the level of moisture in the hair.

The device with more processing power or smart processing device could also have an interactive user interface, for example an LCD screen, to provide direct visual or audio feedback to the user as well as to allow the user to input feedback. For example, the quality of the style achieved or whether they got the style they required. This information can be used to update and improve Artificial Intelligence (AI) algorithms used in the system.

The smart processing device might also be a pure audio device i.e. a device without a visual UI to which the user speaks and receives audio feedback. An example of this is the commercial available product, Amazon Echo.

Further, the processing of the data could also be communicated to a central server system or cloud for processing with the result being fed back to the devices for user direction and communication.

The method of communication between the beauty product device and device with more processing power could be via a cable or wireless means. Examples of applicable wireless communications include: Bluetooth, WiFi, LoRa, ZigBee, 802.15 standard, NFC or optical means—both visible and IR.

An important aspect of determining how the product is being used and then feeding back usage improvements to the user is related to the processing of the data and the associated algorithms.

Such algorithms could be based upon artificial intelligence techniques, such as forward and back propagation neural networks, deep learning, fuzzy logic etc. or based on pure deterministic comparison algorithms and rule based logic or inference.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Embodiments of the invention will now be described, by way of example only, with reference to the accompanying drawings in which.

OVERVIEW

Figure 1:
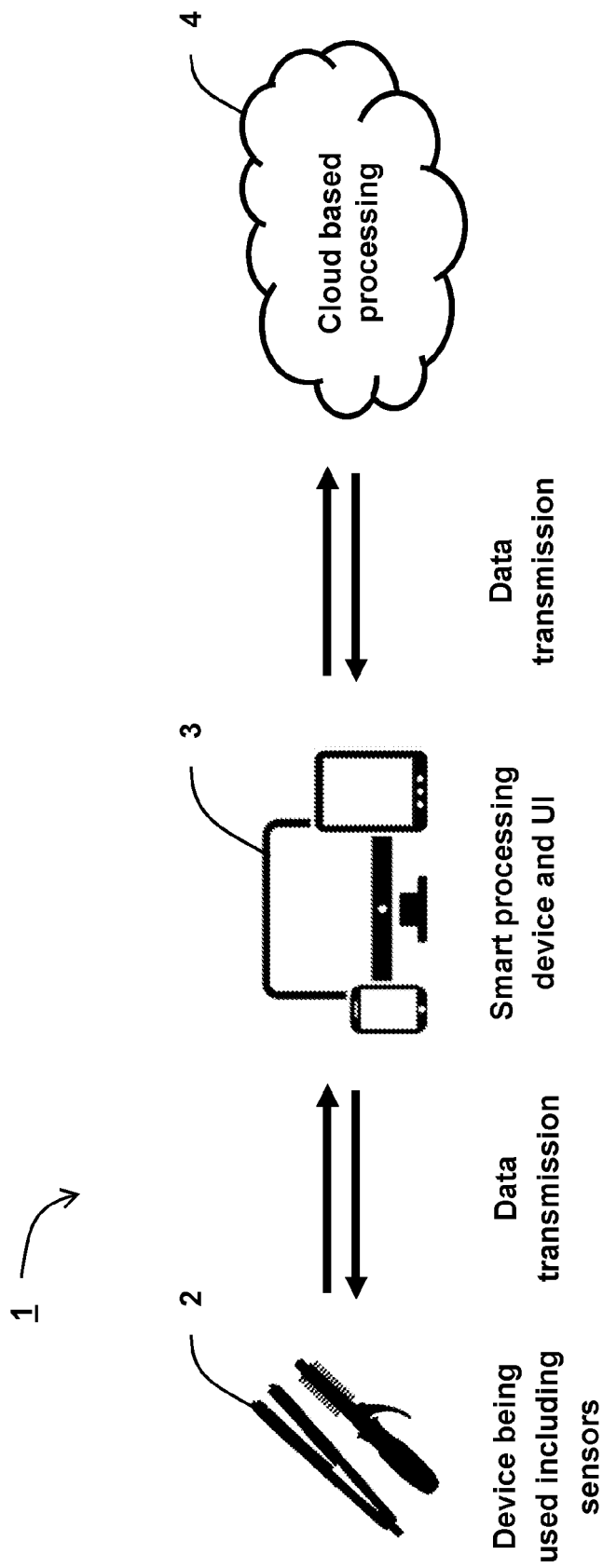
FIG. 1 illustrates schematically a system to which embodiments of the invention may be applied.

FIG. 1 schematically illustrates a system 1 in which the present invention may be implemented. As can be seen, this system 1 includes a beauty product device 2 (e.g. a hair curling/hair straightening device) and a processing device 3 (for example a smartphone, a tablet computer, a laptop, or a personal computer) which are coupled to each other via appropriate data communication means that allows data to be transmitted wirelessly or over a wired connection between the beauty product device 2 and the processing device 3.

In some embodiments, the system 1 may also use cloud based processing functionality (herein represented by a cloud server 4 coupled to the processing device 3) for additional cloud based data processing/data storage related to the operation of the beauty product device 2. The beauty product device 2 and/or the processing device 3 are configured to access the cloud server 4 via a computer network, e.g. an Internet Protocol (IP) network such as the Internet, using an appropriate wired and/or a wireless connection.

The beauty product device 2 includes a number of functional components appropriate for the regular functionality of the beauty product device 2, including for example a handle, one or more heating plates, one or more cooling zones, a cooling fan, an on/off switch, a temperature preselector, a temperature regulator/control circuitry, etc. (depending on the type of the beauty product device 2).

In accordance with the invention, the beauty product device 2 includes additional functionality and associated (hardware and/or software) components that help to provide usage feedback to the end user and for facilitating training/guiding of the user in achieving a desired styling effect.

In more detail, the beauty product device 2 is provided with one or more of the following sensors: a temperature sensor (surface temperature sensor, hair temperature sensor); a gyroscope; an accelerometer; a humidity sensor; a gas sensor; a dielectric sensor; and a power sensor.

Sensor data obtained from these sensors is collected by the beauty product device 2 and packetized and transmitted to the processing device 3 for processing to identify how the beauty product device 2 is being used and to determine feedback to give to the user to help them achieve a desired styling effect. The feedback may be output to the user as an audible or a visual signal via a user interface of the beauty product device 2 or of the processing device 3 (or indeed on the user interface of some other associated device (such as the screen of a nearby television)).

As will be appreciated, the above described system beneficially allows users to improve their use of their beauty product devices and allows them to obtain better styles without the help of a stylist.

This is achieved at least partly by measuring (using appropriate sensors) how the beauty product device 2 is being used and/or how it is performing, and using the obtained data in real-time to generate feedback to the user and/or for controlling the operating parameters of the beauty product device itself. The data that is collected on usage can also be collected and communicated to other devices (e.g. a remote server) for statistical purposes, product improvement, and/or the like. Using sensor based information in combination with real-time user feedback may also help to avoid incorrect usage of the beauty product device 2. Also, the sensor data obtained from a first user's device can be used to control the feedback given to other users to allow for those other users to copy the style of the first user.

A more detailed description will now be given of the hardware and software components forming part of the different system devices introduced above.

Beauty Product Device

Figure 2:
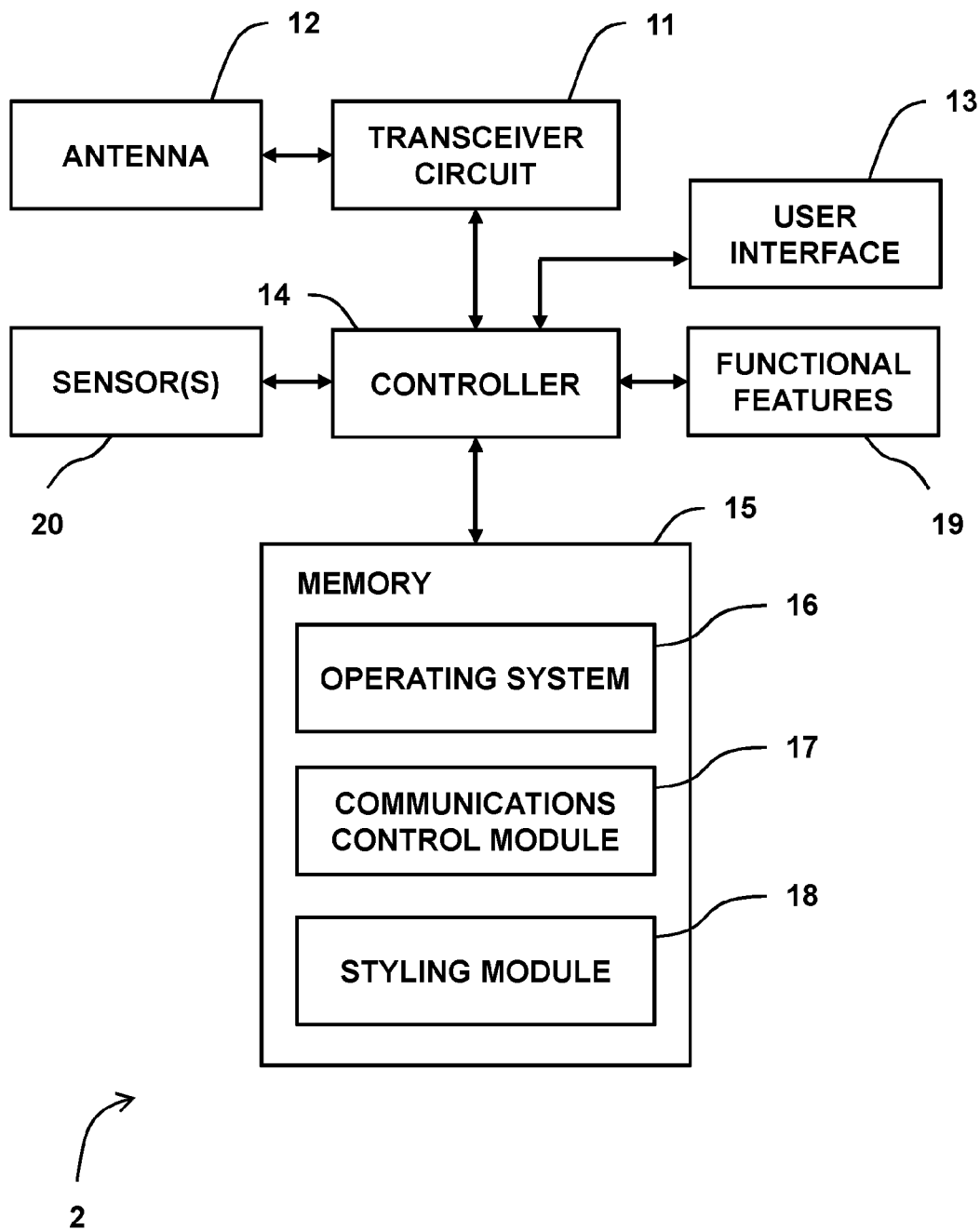
FIG. 2 is a schematic block diagram of a styling device (e.g. hair curling device) forming part of the system shown in FIG. 1.

FIG. 2 is a block diagram illustrating the main data collection and communication components of the beauty product device 2 shown in FIG. 1. As shown, the beauty product device 2 has a transceiver circuit 11 that is operable to transmit signals to and to receive signals from other devices (e.g. the external processing device 3) via one or more antenna 12.

The beauty product device 2 has a controller 14 (such as a micro-processing unit) to control the operation of the beauty product device 2. The controller 14 is associated with a memory 15 and is coupled to the transceiver circuit 11.

The controller 14 is configured to control overall operation of the beauty product device 2 in accordance with user inputs received from a user interface 13 and program instructions or software instructions stored within the memory 15. The software may be pre-installed in the memory 15 and/or may be downloaded via a telecommunications network (e.g. from the cloud server 4) or from a removable data storage device (RMD), for example. As shown in FIG. 2, these software instructions include, among other things, an operating system 16, a communications control module 17, and a styling module 18.

FIG. 2 also shows that the beauty product device 2 includes beauty product device functional features 19. These functional features depend on the beauty product concerned. In the case of a hair styler, these may be the heaters on opposing arms of the device or they may be the fan motor and heater in the case of a hair drying device.

The beauty product device 2 also has one or more sensors 20 coupled to the controller 14 that are used to obtain (e.g. by the styling module 18) various parameters/data relating to the styling process and/or the operation of the beauty product device 2. As discussed above, sensors 20 may include one or more of and preferably several of:

Temperature sensors to measure important surface temperatures e.g. plate temperature. These could be in the form of thermocouples, thermistors or IR sensing devices.

Temperature sensors to measure the temperature of the substrate being treated e.g. IR sensing devices.

MEMS gyroscopes to measure the orientation of the beauty product device 2.

MEMS accelerometer to measure the movement of the beauty product device 2 on three axes.

Humidity sensors to measure the amount of water vapour coming off the substrate during the treatment.

Gas sensors to measure gases coming from the surface during the treatment, particularly sulphur dioxide.

Dielectric sensors to detect variation in the relative permittivity of the substrate being treated. Sensing this property allows any changes in the substrate to be measured as the treatment progresses.

Power used by the beauty product device 2.

The communications control module 17 is operable to control the communication between the beauty product device 2 and other devices (e.g. the external processing device 3 and the cloud server 4).

The styling module 18 is responsible for controlling the functional features 19 in accordance with the user settings input by the user via the user interface 13. In some embodiments, the styling module 18 may also vary the control of the functional features 19 based on feedback received from the external processing device 3. For example if the sensor data reveals that the user is moving the device too slowly across the user's hair then the styling module 18 may reduce the power applied to the hair to prevent it being burnt.

External Device

Figure 3:
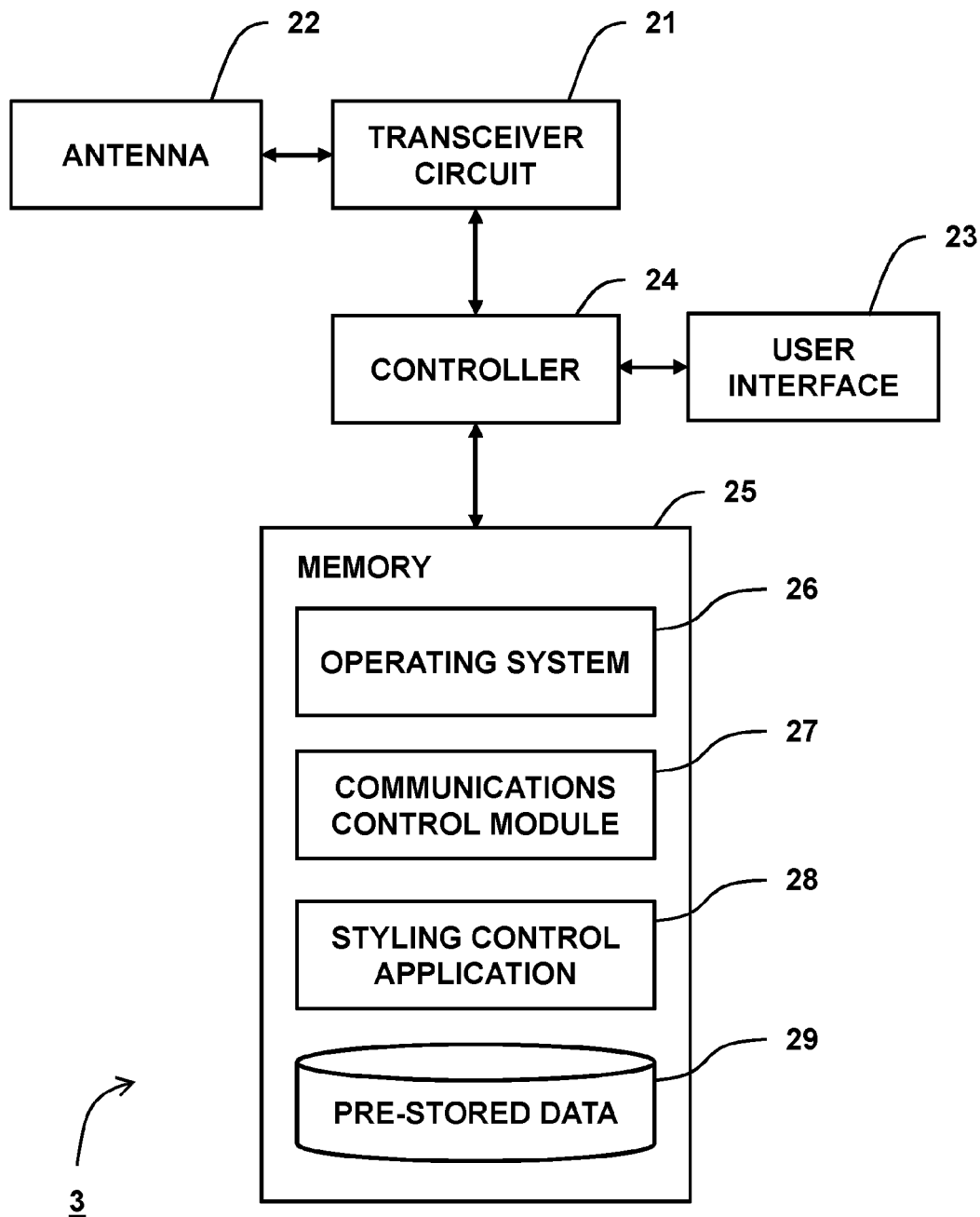
FIG. 3 is a schematic block diagram of a processing device (e.g. smartphone) forming part of the system shown in FIG. 1.

FIG. 3 is a block diagram illustrating the main components of the processing device 3 shown in FIG. 1. As shown, the processing device 3 has a transceiver circuit 21 for transmitting signals to and for receiving signals from the beauty product device 2 via one or more antenna 22. The transceiver circuit 21 may also be used for transmitting signals to and for receiving signals from remote devices, such as the cloud server 4, either wirelessly or using an appropriate wired interface (not shown). Although not necessarily required for its operation, the processing device 3 (e.g. a smartphone and/or the like) might of course have other functionality as well and this may be provided by any one or any combination of hardware, software and firmware, as appropriate.

The processing device 3 has a controller 24 (such as a micro-processing unit) to control the operation of the processing device 3. The controller 24 is associated with a memory 25. The controller 24 is configured to control the overall operation of the processing device 3 by program instructions or software instructions stored within the memory 25. This software may be pre-installed in the memory 25 and/or may be downloaded via a telecommunications network (e.g. from the cloud server 4) or from a removable data storage device (RMD). As shown, these software instructions include, among other things, an operating system 26, a communications control module 27, and a styling control application (App) 28.

The communications control module 27 is operable to control the communication between the processing device 3 and the beauty product device 2, and between the processing device 3 and the cloud server 4 (and any other devices connected to it).

In this embodiment, the communications control module 27 is responsible for receiving the sensor data from the beauty product device 2 and passing it to the styling control App 28. The styling control App 28 compares the received data which indicates how the beauty product device 2 is being used with pre-stored styling data 29 that represents a user selected style they wish to achieve. Based on this comparison, the styling control App 28 generates one or more feedback messages for feeding back to the user to help them achieve the selected style. The styling control App 28 either sends these feedback messages to the user interface 23 for output to the user as an audible or visual signal; or it passes the feedback messages to the communications control module 27 for transmission to another device such as the beauty product device 2.

The pre-stored data 29 may be permanently stored in the processing device 3 or it may be downloaded from the server cloud 4 based on a desired style selected by the user via the user interface 23. Typically the pre-stored data may be a set of deterministic rules or trained information of an AI algorithm (such as a trained neural network) run by the styling control App 28 that relate a sequence of sensor inputs from the beauty product device 3 to one or more feedback messages identifying actions that the user should take to achieve the desired style.

Operation

A more detailed description will now be given (with reference to FIGS. 4 to 9) of some of the exemplary ways in which the present invention may be implemented using the above described beauty product device 2 and external device 3. In the following example, the beauty product device 2 is a hair styling device that allows a user to create curls in their hair. The applicant has already developed numerous such hair styling devices and some of these are described in WO2013/104903 and WO2015/071656, the contents of which are incorporated herein by reference. In short, these documents teach that a good curl to hair can be achieved by firstly heating the hair to above the glass transition temperature of hair, applying a stress to the hair to create the curl and then rapidly cooling the hair to below the glass transition phase temperature to set the curl in place.

Figure 4:
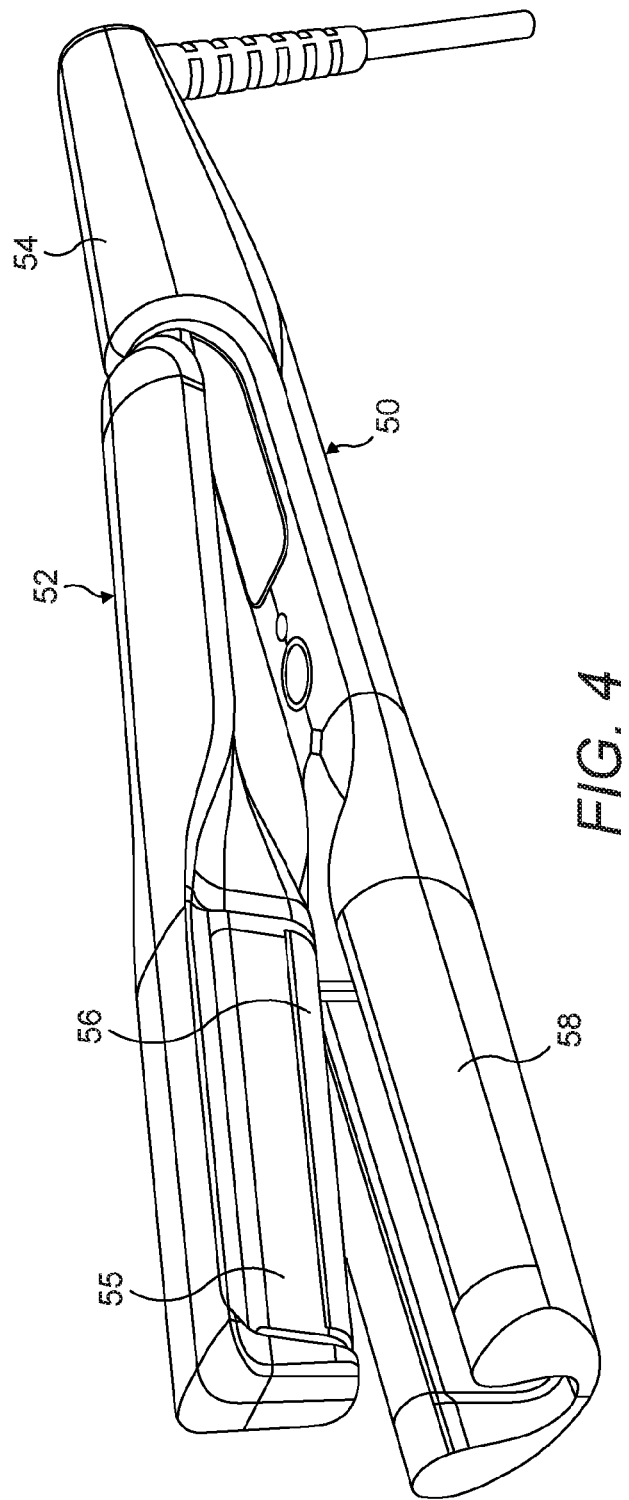
FIG. 4 illustrates a hair styling device as an example of the beauty product device that can be used to curl user's hair.

FIG. 4 illustrates the general arrangement of one suitable hair styling device that can produce a curl and which incorporates the new arrangements of the beauty product device 2 discussed above. The hair styling device 2 comprises a pair of arms 50, 52 which are hinged together at one end 54. The arms are moveable between a closed position in which the opposed ends of the arms from the joined end are adjacent each other and an open position in which the opposed ends of the arms are spaced apart (as shown in FIG. 4). Variants may not comprise a hinge, but still allow for the arms to be moved between open and closed positions. The second arm 52 is shaped so that the end of the arm which is adjacent the end of the first arm 50 in the closed position fits into a corresponding recess in the first arm. The recess is a generally elongate open-ended channel which extends along the portion of the first arm which is in contact with the second arm. The axis of the channel is aligned with the axis of the arm, i.e. the channel extends longitudinally along the arm. The channel has a base and sides. The second arm 52 has a generally elongate section 56 which fits within the recess of the first arm 50.

The second arm 52 has a pair of heating zones arranged to extend along at least a significant part of one long side of the elongate section 56. The first arm also has a pair of heating zones arranged to extend along at least a significant part of one long side of the recess. Thus, the heating zones extend longitudinally along the apparatus, i.e. parallel to the length or long axis of the apparatus. The heating zones on the first arm are adjacent and generally in contact with the heating zones on the second arm when the arms are in the closed position. Each heating zone is heated by a respective heater (not shown). Each heating zone has a generally planar contacting surface and may be formed as a heating plate, e.g. from ceramics or metal, e.g. aluminium, which may/may not have a thermal coating. One or both arms also have one or more cooling zones which are arranged adjacent to a heating zone. The cooling zones may be curved to help curl hair which passes through the device. By providing a pair of cooling zones, hair can be curled by pulling the apparatus in either direction along the hair. Further detail of the hair styling device 2 can be found in the above described PCT publications.

So with the beauty product device 2 of the invention, the amount of curl that the user is imparting to their hair can be determined in real time and advice given to the user on how to get the curl they desire. In the most basic case, the amount of curl can be determined by various factors, including: amount of contact of the hair with the cooling zone, speed of operation, and the angle at which the device is being held by the user during use. Thus to determine the difference between creating straight hair and a curl, the processing algorithm used by the styling control App 28 in the processing device 3 can measure the cooling zone temperature. To make a curl, the hair has to be in contact with the cooling zone and the inventors have found that the temperature of the cooling zone will rise to over 80 degrees due to heat energy being transferred from the hair into the cooling zone. Hence, the algorithm can be very basic: a simple rule statement: If the maximum temperature of the cooling zone is less than 65 degC, then straight hair will be produced, otherwise a curl will be produced.

Figure 5:
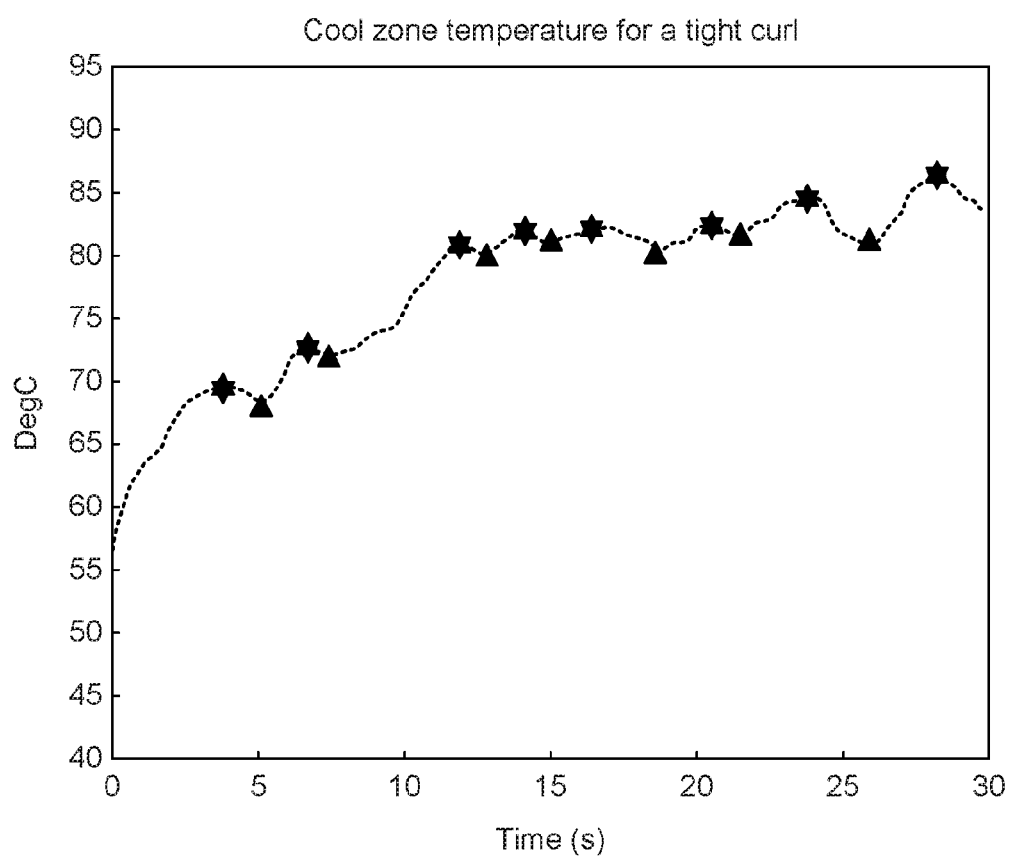
FIGS. 5 to 8 illustrate schematically some of the parameters that may be used in a styling procedure in the system shown in FIG. 1.
Figure 6:
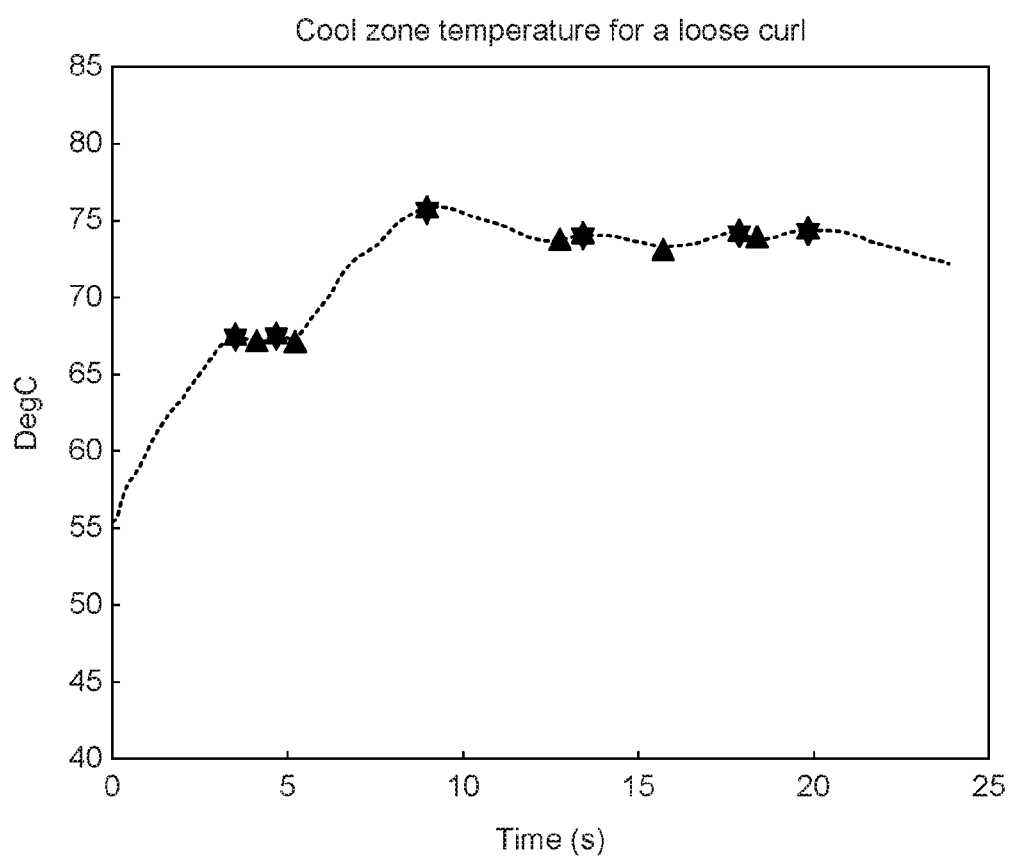

Curl differences can also be detected. The inventors have found that the key to detecting the difference between the types of curl (a tight curl or a loose curl) achieved can be determined by analysing the time based shape of the temperature profile of the cooling zone. Basically, the temperature profile for a loose curl is much smoother than for tight curls. This is illustrated in the plots shown in FIGS. 5 and 6. In particular FIG. 5 is a plot showing how the sensed temperature of the cooling zone varies over time when a tight curl is being produced and FIG. 6 is a plot showing how the sensed temperature of the cooling zone varies over time when a loose curl is being produced. The stars and triangles show points of local maxima and minima respectively.

As the start time of the styling is not known, the styling control App 28 first looks for the time when the temperature exceeds 55 DegC and ignores everything before it. The styling control App 28 then calculates the percentage CV (coefficient of variation) between the first and last maxima and uses this to determine if a loose or tight curl was achieved. If the percentage CV is about 3.5 then a tight curl has been achieved, else a loose curl has been achieved. The inventors have found that this approach provides a highly reliable way to differentiate between the types of curl produced (shows a significant statistical difference at the 95% confidence interval).

Figure 7:
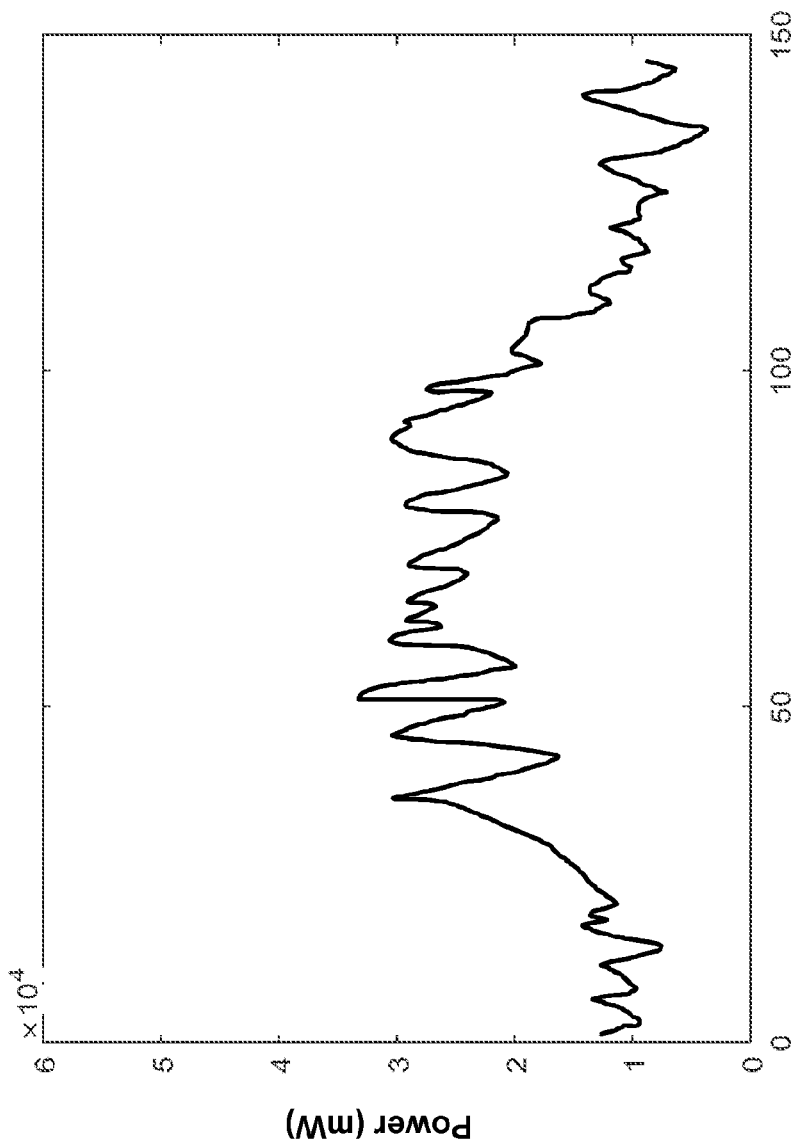
Figure 8:
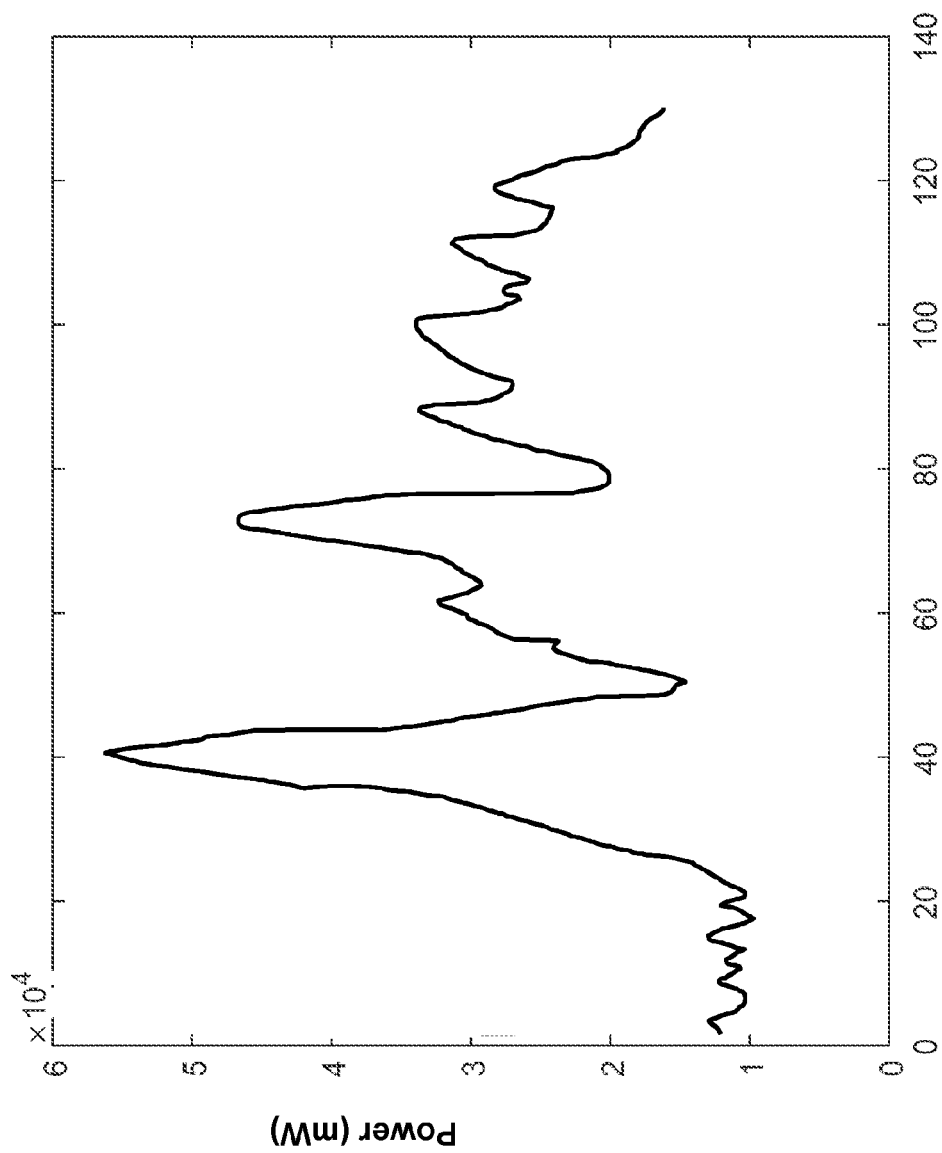

Another factor that the inventors have found to affect the usage of the device is the amount of hair that is loaded into the device—which also affects the ability of the device 2 to make a curl. This can be detected by monitoring the power supplied to the heaters of the hair styling device 2. In particular, when room temperature hair touches the heaters the hair will cool the heaters down. The hair styling device 2 will respond to this by applying more power to the heaters to try to keep the heaters at a constant temperature. The more hair that is in contact with the heaters, the more power is required to keep the temperature of the heaters constant. For a medium sized hair tress, the inventors have found that the power required is about 30 W whereas for a large sized hair tress, the power required increases to over 50 W. This is illustrated in FIGS. 7 and 8—FIG. 7 showing the power usage vs time when a medium sized hair tress is pulled through the hair styler 2 and FIG. 8 showing the power usage vs time when a large sized hair tress is pulled through the hair styler 2. Accordingly, the styling control App 28 can use a simple rule based inference: if the heater power is above 40 W, too much hair has been loaded in the hair styling device 2, else the right amount is used.

Figure 9:
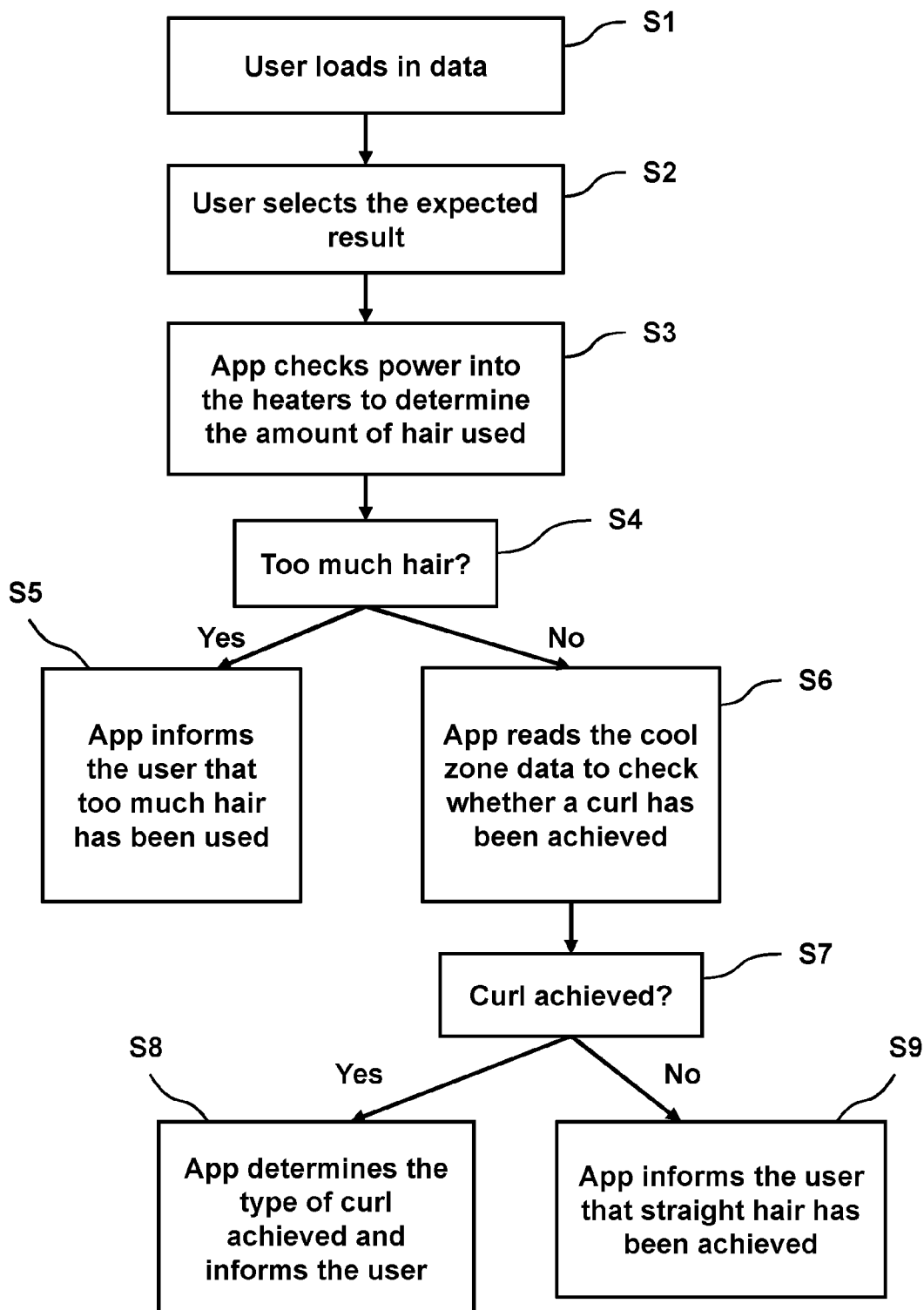
FIG. 9 is a flowchart illustrating an exemplary way in which embodiments of the invention can be implemented in the system of FIG. 1.

FIG. 9 is a flowchart illustrating an example process performed by the styling control App 28 to deal with the above two factors. Initially, as generally shown in step S1, the user selects a desired style/styling group via the user interface 13 of the hair styling device 2 or via the user interface of the processing device 3. If entered into the hair styling device 2, then the styling module 18 generates and sends (via the communications control module 17) a message to the styling control App 28 in the processing device 3 to identify the style to be achieved. The styling control App 28 uses this information to download from the cloud server 4 appropriate pre-stored data 29 for that style. Various other initialisation steps may also take place, such as downloading an update for the styling device 2 and the processing device 3; interaction with the user such as, for example, loading a user profile; identifying the user; prompting the user for menu selections (such as how they wish the feedback messages to be presented to the user), receiving user input (e.g. voice input, keypress (physical/software key), obtaining confirmation and/or authorisation to start the styling process), and/or the like. In step S2 the user selects the expected result from a menu, using the user interface 23 of the processing device 3 coupled to the styling device 2 (or the user interface 13 of the styling device 2). In this example, the user can select between performing hair straightening and hair curling using the styling device 2. It will be appreciated that further sub-options could of course be selected such as a tight or loose curl styling option.

In step S3 the styling control App 28 checks the sensor data received from the hair styling device 2 relating to the power applied to the heaters to determine the amount of hair that has been loaded into the hair styling device 2. In step S4, the styling control App determines if too much hair has been loaded into the hair styling device 2—by comparing the power data with the appropriate threshold power level (in this example 40W). If the power data is higher than 40 W then the processing proceeds to step S5 where the styling control App 28 outputs a feedback message to the user (for example via the user interface 23) to warn them that they have placed too much hair into the hair styling device 2.

If the power is not above 40 W, then the styling control App 28 determines that the right amount of hair has been loaded into the hair styling device 2 and, in step S6, reads the cool zone temperature data to allow the App 28 to check, in step S7, whether or not a curl has been achieved. If a curl has been achieved (because the temperature of the cooling zone has reached higher than 65 degC), then in step S8, the styling control App 28 considers the temperature profile to determine the type of curl that has been achieved and outputs an appropriate feedback message to the user. If a curl has not been achieved then in step S9, the styling control App 28 outputs a feedback message to the user saying that straight hair has been achieved. If the user's original desire was to achieve a curl, then the styling control App 28 also outputs a feedback message with suggested ways to achieve the desired curl. For example by informing the user to change the angle at which they are holding the device or by moving the device more slowly over their hair.

As those skilled in the art will appreciate, many other factors can be monitored. For example, another factor that affects the style that is achieved is the speed with which the user pulls the device along their hair. Often the desired style is not achieved because the user has pulled the device through their hair too quickly. The styling control App 28 can use sensor data from an accelerometer to detect the speed with which the user is moving the device along their hair. In this case, the feedback message given to the user may therefore be to tell the user to slow down or speed up their motion.

As those skilled in the art will appreciate, the above system offers a number of greatly improved practical benefits for the ordinary user. The system is able to give real time feedback on what they are doing wrong and why they are not achieving the styling they want to achieve. Additionally, the sensor data produced by one user when styling or applying a beauty treatment can be saved and provided to other users who wish to copy that user's style or treatment (for example to allow a user to copy the styling of a particular celebrity). In particular, the styling data obtained from the original user can be processed to create a styling profile—that effectively defines the pre-stored data 29 required by the styling control App 28 of the other user's device.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

For the purposes of simplicity, the above description focuses on hair care products and particularly a hair curling device. However, it will be appreciated that the above described concepts may be applied widely to any hair styling product and/or other beauty product/devices in the beauty industry, including, for example: hair dryers, curling tongs/wands, hair straighteners, nail gel/varnish curers (such as UV lamp systems for the curing of nail varnish), skin epilators, hair colouring devices, crimpers, etc.

In the above embodiments, the beauty product device communicated with a smart processing device. This is not essential—the beauty product device may be provided with all the processing functionality of the processing device 3. Further, the processing of the sensor data could also be communicated to a central server system or cloud for processing with the result being fed back to the devices for user direction and communication.

In the above examples, the feedback messages were transmitted provided to the user by way of the user interface on the beauty product device or on the processing device. This is not essential. The feedback messages may be provided by any suitable user interface of any nearby device. For example, they may be sent to an Amazon Echo speaker device for playout to the user as voice messages or displayed to the user on a television screen or the like.

The method of communication between the beauty product device and the processing device could be via a cable or wireless means. Examples of applicable wireless communications include: Bluetooth, WiFi, LoRa, ZigBee, 802.15 standard, NFC or optical means—both visible and IR.

In the examples given above, various specific temperatures and power levels were discussed. As those skilled in the art will appreciate, all these specific values are clearly not essential to the invention and the particular values used in a given product will depend on the treatment to be given, the voltage sources used etc.

An important aspect of determining how the product is being used and then feeding back usage improvements to the user is the processing of the sensor data by the styling control App 28. In the above examples, this processing was based on pure deterministic comparison algorithms and rule based logic or inference. Instead, such algorithms could be based upon artificial intelligence techniques, such as forward and back propagation neural networks, deep learning, fuzzy logic etc. In this case feedback from the user as to whether the feedback messages helped to create the style the user wanted to achieve can be used to train the artificial intelligence model.

In the above embodiments, a number of software modules were described. As those skilled in the art will appreciate, the software modules may be provided in compiled or un-compiled form and may be supplied to the beauty product device or the corresponding processing device (mobile telephone and/or the like) as a signal over a computer network, or on a recording medium. Further, the functionality performed by part or all of this software may be performed using one or more dedicated hardware circuits. However, the use of software is preferred as it facilitates the updating of the beauty product device (and the processing device).

Various other modifications will be apparent to those skilled in the art and will not be described in further detail here.

The invention claimed is:

1. A hair styling system for styling hair, the system comprising:
   a user interface for allowing a user to provide user input to control the hair styling system and for outputting information to the user;
   a hair styling device that is manipulable by the user to perform a desired hair styling on the hair, the hair styling device having one or more heaters for heating the hair, and a sensor that provides sensor data indicating movement of the hair styling device; and
   a processor configured to process the sensor data to determine a speed at which the user is moving the hair styling device across the hair, and wherein the processor is configured to vary power applied to the one or more heaters based upon the determined speed to prevent the hair from being burnt.

2. The hair styling system of claim 1, wherein the hair styling device comprises communication circuitry and is configured to transmit the sensor data to an external processing device.

3. The hair styling system of claim 2, wherein the processor is provided in the external processing device.

4. The hair styling system of claim 1, wherein the sensor data includes motion data that indicates how the hair styling device is being moved by the user, wherein the processor is configured to compare the motion data with pre-stored data that includes information on how the device should be moved by the user to achieve a desired hair style and wherein the processor is configured to cause one or more feedback messages to be output to the user to help the user achieve the desired hair style.

5. The hair styling system of claim 1, wherein the processor is configured to process the sensor data to determine if usage by the user of the hair styling device will achieve the user's desired hair styling and is configured to provide feedback to achieve the desired hair styling and wherein the hair styling device is configured to vary the control of functional features of the hair styling device based on the feedback from the processor.

6. The hair styling system of claim 1, wherein the processor is configured to process sensor data to determine diagnostic information about the hair being treated.

7. The hair styling system of claim 6, wherein the diagnostic information comprises a level of moisture in the hair.

8. The hair styling system of claim 1, wherein the hair styling device further comprises at least one cooling zone for cooling the hair and a temperature sensor for sensing the temperature of the at least one cooling zone and wherein the processor is configured to determine if the temperature of the at least one cooling zone is above a threshold temperature to determine if a curl has been achieved.

9. The hair styling system of claim 1, wherein the processor is provided in the hair styling device.

10. A hair styling method using a hair styling system, the method comprising:
    providing a user interface for allowing the user to provide user input to control the hair styling system and for outputting information to the user;
    providing a hair styling device that is manipulable by the user to perform a desired hair style on the user's hair, wherein the hair styling device comprises one or more heaters for heating the hair, and a sensor that provides sensor data indicating movement of the hair styling device;
    processing, using a processor, the sensor data to determine a speed at which the user is moving the hair styling device across the hair, and wherein the processor is configured to vary power applied to the one or more heaters based upon the determined speed to prevent the hair from being burnt.

11. The hair styling method of claim 10, comprising transmitting the sensor data to an external processing device.

12. The hair styling method of claim 11, wherein the processing is performed in the external processing device.

13. The hair styling method of claim 10, wherein the sensor data includes motion data that indicates how the hair styling device is being moved by the user, wherein the processing compares the motion data with pre-stored data that includes information on how the device should be moved by the user to achieve a desired hair style and wherein the method further includes outputting one or more feedback messages to the user to help the user achieve the desired hair style.

14. The hair styling method of claim 10, wherein the processing includes processing the sensor data to determine if usage by the user of the hair styling device will achieve the desired hair style and providing feedback to achieve the desired hair styling and wherein the hair styling device varies the control of functional features of the hair styling device based on the feedback from the processing.

15. The hair styling method of claim 10, further comprising processing sensor data to determine diagnostic information about the hair being treated.

16. The hair styling method of claim 15, wherein the diagnostic information comprises a level of moisture in the hair.

17. The hair styling method of claim 10, wherein the hair styling device further comprises at least one cooling zone for cooling the hair and a temperature sensor for sensing the temperature of the at least one cooling zone and wherein the processing determines if the temperature of the at least one cooling zone is above a threshold temperature to determine if a curl has been achieved.

18. The hair styling method of claim 10, wherein the processing is performed on the hair styling device.

19. The hair styling method of claim 10, wherein a tangible computer readable medium comprising computer executable instructions causes a programmable device to carry out the hair styling method.

20. The hair styling system of claim 1,
wherein the hair styling device further comprises a power sensor for sensing and outputting sensor data indicating power supplied to the one or more heaters, and
wherein the processor is further configured to:
- process the sensor data from the power sensor to determine if the power supplied to the one or more heaters is greater than a threshold value; and
- upon determining that the power supplied to the one or more heaters is greater than the threshold value, cause the user interface to output a feedback message indicating that too much hair has been loaded into the hair styling device.

21. The hair styling system of claim 20, wherein the output feedback message is output on a user interface associated with the user.

22. The hair styling system of claim 20, wherein the output feedback message is output to the user as an audible or visual signal.

23. The hair styling method of claim 10,
wherein the hair styling device further comprises a power sensor for sensing and outputting sensor data indicating power supplied to the one or more heaters, and
wherein processing the sensor data further comprises:
- processing the sensor data from the power sensor to determine if the power supplied to the one or more heaters is greater than a threshold value; and
- upon determining that the power supplied to the one or more heaters is greater than the threshold value, causing the user interface to output a feedback message indicating that too much hair has been loaded into the hair styling device.

24. The hair styling method of claim 23, wherein the output feedback message is output on a user interface associated with the user.

25. The hair styling method of claim 23, wherein the output feedback message is output to the user as an audible or visual signal.

\* \* \* \* \*